United States Patent Office 3,357,842
Patented Dec. 12, 1967

3,357,842
FURNACE AND REFRACTORY
Jan Bowman, Los Gatos, Calif., assignor to Kaiser Aluminum & Chemical Corporation, Oakland, Calif., a corporation of Delaware
No Drawing. Filed May 28, 1965, Ser. No. 459,919
7 Claims. (Cl. 106—58)

This invention concerns refractory structures, methods of making such structures, and refractory compositions for use therein.

Although it has been conventional to build refractory structures such as furnaces, for example metallurgical furnaces, of shaped refractories in the form of bricks and other shapes, there has been an increasing tendency in recent years to use monolithic refractories, for example, in the form of cast, rammed, or gunned materials.

While the placement of refractories by gunning is used in forming a new refractory structure, the gunning method is particularly useful for repairing or patching furnaces during the course of their useful life, thus prolonging that life. While this patching can be done while the furnace has cooled down between heats or firings, it is often desirable to gun repair material onto a hot furnace wall.

In addition to the usual characteristics of a refractory material such as strength at high temperatures, spalling resistance, resistance to slag attack, and the like, a refractory composition suitable for gunning must have several special characteristics. In the first place, a gunnable refractory composition must flow smoothly through the gun apparatus. Second, the gunned refractory must stick on the furnace wall against which it is projected and not have an appreciable amount of rebound or lost material. Third, the composition must set up quite rapidly to a self-sustaining condition. In other words, the material as it is placed, on the furnace wall for example, must not be so plastic as to slump under its own weight. This characteristic determines the thickness of the layer which can be built up on a surface. Finally, the gunned refractory must stay in place as it is heated up and not spall or "pop" off. Such spalling or popping is believed to be due to chemical reactions and the release of water or other vapor during the heating up period.

The present invention comprehends a cementitious composition consisting essentially of at least 3% by weight monosodium dihydrogen orthophosphate, the balance of the composition being a reactive alkaline earth metal oxide containing compound of a size such that substantially all passes a 100 mesh screen. The composition contains at least sufficient alkaline earth metal oxide-containing compound to provide enough alkaline earth metal oxide to react with half the monosodium phosphate to form alkaline earth metal oxide monohydrogen orthophosphate according to Equation 1 below. When such a cementitious composition is used as a room temperature or cold setting bond for a refractory composition, the total refractory composition consists essentially of from about 1% to about 5% by weight monosodium dihydrogen orthophosphate, the balance of the composition being sized refractory grain and the alkaline earth metal oxide containing compound passing a 100 mesh screen, such material being present in at least sufficient amount to yield enough alkaline earth metal oxide to react with half the monosodium phosphate to form alkali metal hydrogen orthophosphate, again according to Equation 1. It will be understood that any of the refractory grain which passes a 100 mesh screen will be nonreactive, as is more fully explained below.

It has been found that such a refractory composition is particularly adapted to gunning, in part because of its rapid setting action and firm adherence. A refractory composition particularly suitable for gunning is one consisting essentially of about 70%, for example from 67% to 73% by weight refractory grain retained on a 100 mesh screen, from 0.05% to 2% by weight plasticizer, and from 1% to 5% by weight monosodium orthophosphate ($NaH_2PO_4$) an amount up to about 25% by weight of a reactive alkaline earth metal oxide containing compound passing a 100 mesh screen, said material being present in at least an amount sufficient to provide enough alkaline earth metal oxide to react with half the monosodium phosphate to form alkaline earth metal oxide monohydrogen orthophosphate, the balance of the composition being non-reactive refractory grain passing a 100 mesh screen.

It has also been found, according to this invention that a monolithic lining can be formed on a refractory structure, for example, the inner wall or surface of a furnace, by gunning thereon a refractory composition such as described above. In gunning, the admixture is fed to a gun nozzle in a manner generally known in the art, for example by compressed air, and a tempering amount of liquid, for example, water added to it at the gun nozzle. The wetted mixture is projected through the gun nozzle and onto the refractory structure upon which the monolithic lining is to be formed.

The coarse refractory grain or aggregate can be any refractory material, for example, calcined fireclay grog, ganister, alumina, silicon carbide, and the like. However, this invention has been found to be particularly useful when the refractory composition contains basic or non-acid metal oxide refractory grains such as periclase, dead-burned magnesite, chromite, magnesia spinels, and the like, and mixtures of two or more of these with each other or with other refractory grain.

The reactive alkaline earth metal oxide containing compound used can be perclase, magnesite, an MgO-containing spinel such as $MgO \cdot Al_2O_3$, or any reactive MgO-containing refractory or a CaO-containing material such as calcined limestone or mixtures of these with each other. While it is not intended to be bound by any particular theory, it is believed that the reactive alkaline earth metal oxide reacts with the monosodium phosphate to form compounds according to Equation 1:

(1) 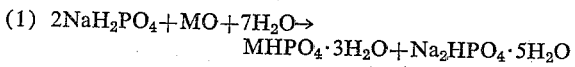
$$2NaH_2PO_4 + MO + 7H_2O \rightarrow MHPO_4 \cdot 3H_2O + Na_2HPO_4 \cdot 5H_2O$$

where M represents an alkaline earth metal, for example, Mg or Ca. It is believed that these reaction products, when heated, lose their water of hydration below 700° C. according to Equations 2:

(2a) 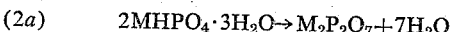 $2MHPO_4 \cdot 3H_2O \rightarrow M_2P_2O_7 + 7H_2O$ (2b) 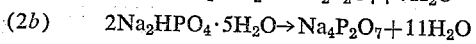 $2Na_2HPO_4 \cdot 5H_2O \rightarrow Na_4P_2O_7 + 11H_2O$ It will be understood that the release of chemically combined water by compounds during a rapid temperature increase is often accompanied by rapid steam generation and severe dislocations called "explosions," "spalling," or "popping."

Whether a particular alkaline earth metal oxide containing compound is reactive or not can be determined by mixing a slurry of that material with at least the stoichiometric amount of monosodium phosphate required to react, according to Equation 1, with the amount of alkaline earth metal oxide in the compound as determined by chemical analysis. After allowing sufficient time for the reaction to take place, the insoluble matter is removed and heated to 1000° C. Then, the presence or absence of the pyro phosphate ($M_2P_2O_7$) is determined by X-ray analysis. A reactive compound will show the pyrophosphate under X-ray analysis, whereas a material which is nonreactive will not show such a product. It has been found that materials containing over about 25% by weight alkaline earth metal oxide, for example, periclase, magnesite, lime, and grain made by reacting at high temperatures equal portions of lightly calcined magnesia and chrome ore, are reactive whereas materials containing less than about 25% alkaline earth metal oxide, for example, chrome ore, are not reactive. However, the critical test of reactivity is the reaction and X-ray analysis test described above. The term "non-reactive refractory grain" means material which does not show a reaction according to the above equations.

According to this invention, in a hot gunning mix a controlled amount of reactive alkaline earth metal oxide containing compound is included in the −100 mesh fraction of the mix so that sufficient reaction bonding takes place, but not so much that excessive amounts of water are released upon heating to cause spalling or popping. It will be understood that for cold gunning the maximum amount of reactive material is not as critical because popping or spalling can be controlled by slow heatup rates.

For a gunning composition containing monosodium phosphate, it has also been found that the total amount of material passing a 100 mesh screen, including both finely divided refractory grain and bonding components, should be about 30%, for example, from 27% to 33%, by weight of the total composition. Thus, for example, where the refractory contains 5% by weight monosodium phosphate and plasticizer, the finely divided reactive alkaline earth metal oxide material and refractory grain will be about 25%, for example from 22% to 28% by weight. Larger amounts than this tend to form an impermeable structure and may, in some instances, lead to spalling or popping of the emplaced refractory because reaction products in vapor form are unable to escape. Larger amounts also create a poor flowing mix that tends to plug the refractory gun. A lesser amount of fines tends to form a less dense refractory structure, whereas in most instances maximum density is desired in a refractory structure for good wearing and strength.

While the use of a plasticizer in a gun mix is not absolutely essential, it is generally found that its use imparts desirable characteristics to the mix, for example better sticking. The plasticizer used in the practice of this invention can be a clay of suitable plasticity, a preferred material being from about 1% to about 2% bentonite, or it can be an organic plasticizer such as carboxymethylcellulose. When organic plasticizers are used, generally a small amount, up to 1% by weight will suffice.

The monosodium orthophosphate (MSP) is generally added to the composition in the form of a dry powder, since this will allow formulation of a composition which can be packed and shipped by a refractories manufacturer to the user. However, the MSP can be added to the refractory composition as a liquid solution, for example by dissolving it in the tempering water and adding the solution at the gun nozzle as the remainder of the composition is fed to the gun. Although the compositions of this invention are particularly adapted to be gunned onto a furnace wall to form a monolithic lining thereon, they can also be used to ram or cast monolithic structures and can be formed into shapes, as by pressing, casting, or other desired method.

It is an advantage of refractory compositions according to this invention that they can be gunned onto a hot furnace wall, that they will stick to such a wall, and will show little rebound or loss of material from the wall. It is also an advantage of these compositions that they will not spall or pop off the wall after they have been placed.

Example 1

As an example of the practice of this invention, the following composition was made: 33.5 parts periclase, substantially all of which passed a 6 mesh screen and substantially all of which was retained on a 20 mesh screen; 36.4 parts chrome ore, substantially all of which passed a 14 mesh screen and substantially all of which was retained on a 100 mesh screen; 18.9 parts of the same periclase passing a 100 mesh screen; 6.5 parts of the same chromite passing a 100 mesh screen; 3.2 parts $NaH_2PO_4$; and 1.5 parts Wyoming bentonite. The periclase had the following typical chemical composition: 2.1% $SiO_2$; 0.3% $Al_2O_3$; 0.4% $Fe_2O_3$; 1.1% CaO; 0.3% $Cr_2O_3$; and 95.8% MgO, by difference. The chromite was a Masinloc ore obtained from the Philippines and had the following typical chemical composition: 4.5% $SiO_2$; 12.0% FeO; 28.0% $Al_2O_3$; 29.7% $Cr_2O_3$; 0.7% CaO; and 25.1% MgO. This composition was fed to a Ridley gun where it was mixed at the nozzle with about 8% water and projected onto a hot furnace wall, the temperature of which was about 1000° C. The composition gunned well, stuck very well to the wall, built up a thickness of about 3 inches, and showed no popping or spalling after placement.

The preceding example is to be compared with a composition entirely the same except that it contained no chromite passing a 100 mesh screen, all the chromite, 42.9 parts being +100 mesh and all the refractory grain passing a 100 mesh screen, i.e., 25.4 parts, being periclase. This composition while it flowed well through the gun and stuck well to the hot furnace wall, exhibited excessive popping or spalling after being in place a few minutes.

A further comparison is to be made between the composition of Example 1 and a composition with the same bond but containing 29.4 parts periclase and no chromite passing a 100 mesh screen, the amount of +100 mesh grain being reduced to 65.9 parts. This third composition, with the larger amount of fine refractory grain, did not pass through the gun properly, but led to plugging and clogging within the lance nozzle. When it is considered that this composition of refractory grain has been successfully gunned with a sodium silicate bond, it can be seen that the use of monosodium orthophosphate, a material which imparts exceptionally good hot sticking ability to the gun mix, requires a modification of the sizing of prior refractory grain compositions in order to achieve successful gunning.

Example 2

As another example of the practice of this invention, a composition consisting of 80 parts of 4 mesh silica (ganister) batts, 20 parts crushed silica batts, 5.9 parts (5.3%) ball milled periclase, 1.5 parts bentonite, and 3.4 parts monosodium phosphate was gunned onto a wall with only 32% rebound. The gunned material had a cold crushing strength of 990 p.s.i.

A composition the same as that of Example 2 but containing only 3.2 parts (3.0%) ball milled periclase gave good service after gunning onto a furnace wall, but showed a rebound of 55% during gunning and had a cold crushing strength of only 495 p.s.i.

Example 3

A refractory grain made by reacting equal weight parts of lightly calcined magnesia and Transvaal chrome ore in a rotary kiln was admixed with 3.2% by weight monosodium orthophosphate, 1.5% bentonite, and about 8% $H_2O$, the mixture being gunned onto a vertical wall where it adhered well without excess rebound and remained coherent during heating up of the refractory. The lightly calcined magnesia had the following typical analysis: 1.0% CaO; 0.4% $SiO_2$; 0.1% $Al_2O_3$; 0.1% $Fe_2O_3$; and 98.4% MgO (by difference) and was made by reacting calcined dolomite with the $MgCl_2$ of sea water. The chrome ore had the following typical chemical analysis: 11.8% MgO; 0.5% CaO; 2.4% $SiO_2$; 13.9% $Al_2O_3$; 27.0% $Fe_2O_3$; and 44.4% $Cr_2O_3$. The fired grain analyzed about 55% MgO.

Example 4

As an example of the practice of this invention using a CaO-containing material, 5 parts quick lime (CaO), 3.2 parts monosodium phosphate ($NaH_2PO_4$), 1.5 parts bentonite, and 90.3 parts sized chrome ore of the type described in Example 1 were gunned onto a furnace wall.

The composition gunned well with low rebound, adhered to the wall, and set almost immediately.

Although the invention has been described showing monosodium phosphate, in combination with a finely divided, reactive alkaline earth metal oxide containing compound, as the sole chemical or cold-setting bonding agent, it will be understood that other conventional cold or room temperature bonding materials such as waste sulfite liquor, chromic acid, magnesium sulfate, sodium tripolyphosphate, and the like, can additionally be incorporated in the monosodium phosphate-containing compositions of this invention, if desired.

In the specification and claims, percentages and parts are by weight unless otherwise indicated. Mesh sizes referred to herein are Tyler standard screen sizes which are defined in Chemical Engineers' Handbook, John H. Perry, editor-in-chief, third edition, 1950, published by McGraw-Hill Book Company, at page 963. For example, a size passing a 100 mesh screen corresponds to 147 microns, and that passing 200 mesh, to 74 microns. Analyses of mineral components are reported in the usual manner, expressed as simple oxides, e.g., MgO, $SiO_2$, although the components may actually be present in various combinations, e.g., as a magnesium silicate.

Having now described the invention, what is claimed is:

1. A refractory gunning composition consisting essentially of from about 67% to about 73% by weight refractory grain retained on a 100 mesh screen, from about 0.05% to about 2% by weight plasticizer, from about 1% to about 5% by weight monosodium dihydrogen orthophosphate, an amount up to about 25% by weight of a reactive alkaline earth metal oxide containing compound passing a 100 mesh screen, said compound being present in at least an amount sufficient to provide enough alkaline earth metal oxide to react with half the monosodium phosphate to form alkaline earth metal monohydrogen orthophosphate, the balance of the composition being nonreactive refractory grain passing a 100 mesh screen, the total amount of said gunning composition passing 100 mesh being from 27% to 33% by weight.

2. A refractory gunning composition according to claim 1 wherein said plasticizer is from about 1% to about 2% by weight bentonite and said alkaline earth metal oxide containing compound is an MgO-containing compound.

3. A refractory gunning composition according to claim 2 wherein said MgO-containing compound is periclase.

4. A refractory gunning composition according to claim 1 wherein said alkaline earth metal oxide-containing compound is a CaO-containing compound.

5. A refractory gunning composition consisting essentially of from about 67% to about 73% by weight of nonacid refractory oxide grain retained on a 100 mesh screen, from about 1% to about 2% by weight bentonite, from about 1% to about 5% by weight monosodium dihydrogen orthophosphate, and from about 5% to about 25% by weight periclase passing a 100 mesh screen, the balance of the composition being nonreactive nonacid refractory oxide grain passing a 100 mesh screen, the total amount of said gunning composition passing 100 mesh being from 27% to 33% by weight.

6. The method of lining a furnace structure comprising: admixing a refractory composition consisting essentially of from 67% to 73% by weight refractory grain retained on a 100 mesh screen, from 5% to 25% reactive alkaline earth metal oxide containing compound passing a 100 mesh screen, from 0% to 2% plasticizer, and from 1% to 5% monosodium orthophosphate, the balance being nonreactive refractory grain passing a 100 mesh screen, the total amount of said gunning composition passing 100 mesh being from 27% to 33% by weight; feeding said admixture to a gunning nozzle; adding a tempering amount of water to said admixture at said gunning nozzle; and projecting said admixture of water and refractory composition onto a furnace structure.

7. The method of lining a furnace structure comprising: admixing a refractory composition consisting essentially of 67 to 73 parts by weight refractory grain retained on a 100 mesh screen, from 5 to 25 parts by weight reactive alkaline earth metal oxide containing compound passing a 100 mesh screen, from 0 to 2 parts by weight plastic clay, and from 5 to 25 parts by weight nonreactive refractory grain passing a 100 mesh screen; feeding said admixture to a gunning nozzle; adding to said admixture at said gunning nozzle sufficient monosodium orthophosphate solution to provide from 1 to 5 parts by weight monosodium orthophosphate dissolved in a tempering amount of water; and projecting said admixture onto a furnace structure, the total amount of said gunning composition passing 100 mesh being from 27% to 33% by weight.

References Cited
UNITED STATES PATENTS

| | | | |
|---|---|---|---|
| 2,479,504 | 8/1949 | Moore et al. | 106—58 |
| 3,093,497 | 6/1963 | Demaison | 106—59 |

TOBIAS E. LEVOW, *Primary Examiner.*

HELEN M. McCARTHY, JAMES E. POER, *Examiners.*